United States Patent [19]
Bolen

[11] 3,908,253
[45] Sept. 30, 1975

[54] CARTRIDGE CASE TRIMMING MACHINE

[75] Inventor: Robert J. Bolen, Port Penn, Del.

[73] Assignee: Remington Arms Company, Inc., Bridgeport, Conn.

[22] Filed: July 23, 1974

[21] Appl. No.: 490,947

Related U.S. Application Data
[62] Division of Ser. No. 348,488, April 6, 1973, Pat. No. 3,863,529.

[52] U.S. Cl. ............... 29/1.32; 113/120 X; 82/70.2; 82/75
[51] Int. Cl.² ................... B23P 15/22; B23B 5/16
[58] Field of Search........... 29/1.32; 82/70.2, 71–77; 113/120

[56] References Cited
UNITED STATES PATENTS

| | | |
|---|---|---|
| 56,492 | 7/1866 | Fowler et al. ........................ 29/1.32 |
| 311,324 | 1/1885 | Howard ............................... 29/1.32 |
| 1,806,475 | 5/1931 | Lee ........................................ 82/72 |
| 3,548,769 | 12/1970 | Windstrup ...................... 113/120 X |

Primary Examiner—Donald R. Schran
Assistant Examiner—Leon Gilden
Attorney, Agent, or Firm—John H. Lewis, Jr.; Nicholas Skovran; William L. Ericson

[57] ABSTRACT

A mandrel is lowered into an open end portion of a tubular metal casing. A cutting tool is moved inwardly toward the end of the mandrel at a preset rate while revolving around the mandrel at a predetermined speed. The cutting tool severs a ringlet from the open end portion of the casing and holds the severed ringlet on the mandrel until after the mandrel has been removed from the trimming site, whereupon the cutting tool is separated from the mandrel and releases the scrap ringlet for orderly disposal.

8 Claims, 6 Drawing Figures

CARTRIDGE CASE TRIMMING MACHINE

This is a division of application Ser. No. 348,488, filed Apr. 6, 1973 now U.S. Pat. No. 3,863,529.

This invention relates to a machine for cutting-off or trimming metallic tubes or tubular articles and more particularly to a trimming device which includes means for holding the trimmed portions of the tubes for controlled disposal.

For the sake of clarity and conciseness, it is proposed to confine the description of the invention to its application to machines for cutting-off the open ends of metallic tubular articles adapted to the manufacture of cartridge cases, but it will be understood that this particular adaptation is for the purpose of illustration only and that the invention may have other similar and equivalent uses within the scope of the appended claims.

Cartridge cases are generally manufactured from a metal blank. The blank is formed into a cup which is annealed and then drawn to a desired length and wall thickness. This generally cylindrical drawn cup, hereinafter referred to as a casing, normally has one open end which, due to the manner in which the casing is formed, tends to have a rough and uneven edge. To provide a smooth, even edge and ensure that the cartridge cases formed from the casings are of uniform length, a trimming step is utilized to sever the rough, open end portions from the casings.

Lathe-type devices have been utilized in the prior art to perform this trimming step. A typical machine is disclosed in U.S. Pat. No. 2,321,298, issued to Charles R. Johnson on June 8, 1943. The cartridge case is fed into a chuck which rotates the cartridge case at high speed while a trimming means severs a scrap ringlet from its open end. The cartridge case is then ejected from the chuck and a new one inserted. This procedure, requiring insertion and removal of objects in a spinning chuck, is highly time consuming and thus only adaptable to the trimming of center fire cartridge cases.

In the high speed operations required for the production of large numbers of rim fire cartridge cases, it is necessary that the casings be trimmed both rapidly and accurately. To accomplish this, the casings are generally aligned with their open ends extending in one direction and are transported to a cutting site where a knife blade or, more often, a trim saw slices off the uneven end portion.

Due to cost and other factors, there has been an increased tendency to manufacture cartridge cases from materials other than brass. One very popular material has been steel. It has been found that, while casings made of easily machined metals, such as brass, can be easily trimmed by a trim saw, the use of such a device for casings made of less machinable metals, such as carbon steel, results in difficult and inefficient operation.

A trim saw is generally in the form of a high speed circular saw which is mounted in a fixed position while rigidly held casings are transported through the trimming site. The saw is positioned so that it will cut each casing to the same desired length, the plane of the cut being generally perpendicular to the longitudinal axis of the casing. However, the motion of the casings and the high rotational speed of the cutting blade cause the ringlets of metal severed from the open ends of the casings to be randomly propelled at high speed making collection of more than a small portion of the trimming scrap extremely difficult, if not impossible. The scrap thus tends to collect in and around neighboring machinery and, regardless of attempts at prevention, the trimmed metal ringlets, or portions thereof, find their way into moving parts and between bearing surfaces.

This relatively uncontrolled disposal of trim scrap has long been viewed as an undesirable but tolerable problem in the manufacture of brass cartridge cases. Proper collection and disposal of scrap would be desirable but, due to the low hardness and high lubricity of brass, the scrap causes little damage to bearings or other moving parts.

However, in the manufacture of steel cartridge cases, the manner of disposal of scrap is of great significance. Steel has a much greater hardness than does brass and lacks its lubricity. Pieces of steel scrap working their way into a bearing would soon severely damage or destroy it. Moving parts could be jammed or damaged by a buildup of steel scrap.

In accordance with this invention, a novel method and machine are provided for trimming the open end portions from metal casings whereby the trimmed portion is held by the cutter blade after it has been severed from the casing. The trimmed portion is removed from the trimming site and then released so that an orderly disposal of the trimmed portion may be effected.

It is an object of this invention to provide a metal casing trimming means which may be used with either hard or soft metals.

It is another object of this invention to provide a metal casing trimming means which permits orderly disposal of scrap.

It is a further object of this invention to provide a metal casing trimming means having a cutter means which both severs the open end portion from the casing and holds the severed end portion for orderly disposal.

It is an additional object of the invention to provide a method of trimming metal casings whereby severed end portions of the casings are held after severing, removed from the trimming site, and released for orderly disposal.

These and other objects and advantages of this invention can be best described with reference to the accompanying drawings, in which.

Figure 1:
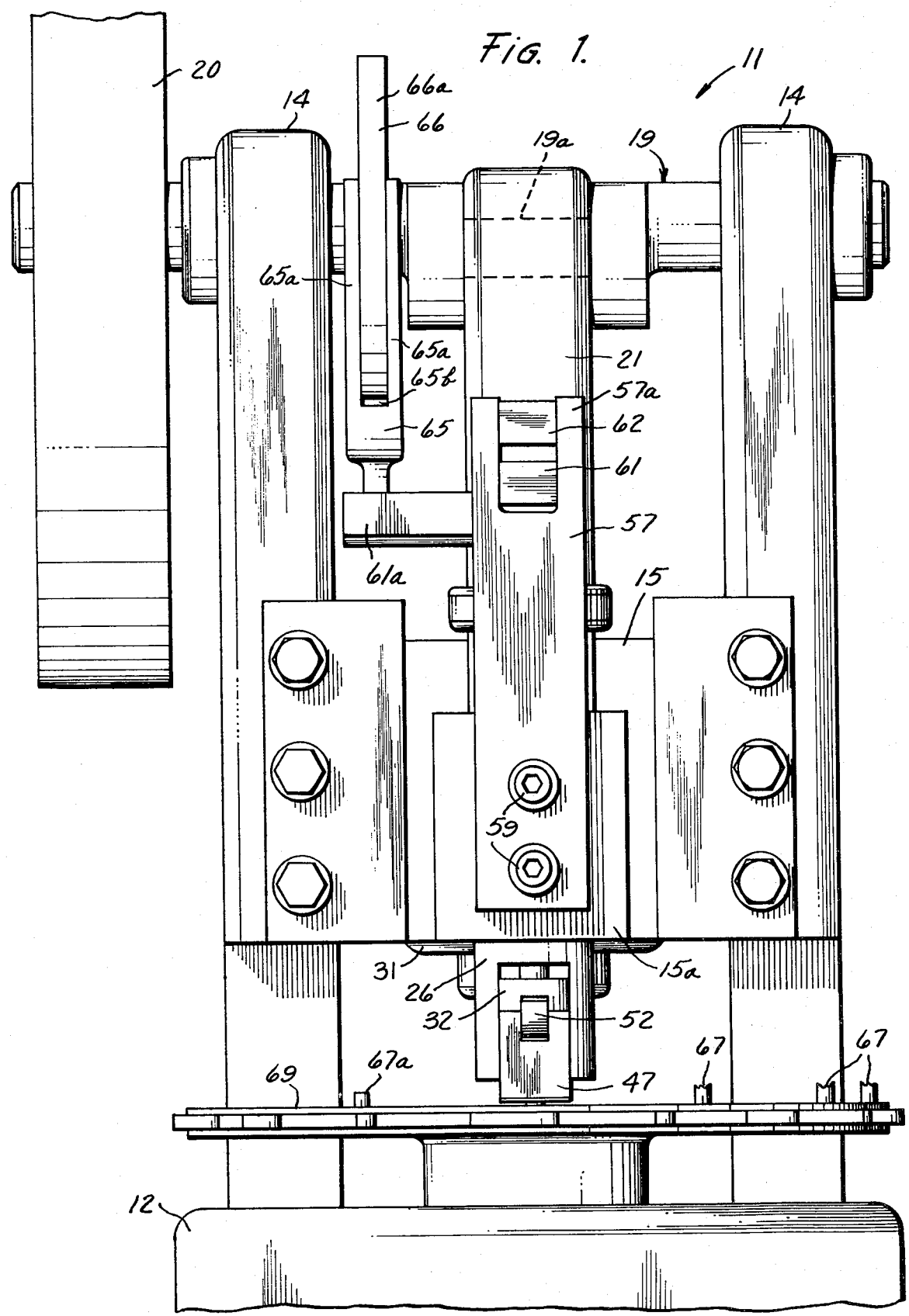
FIG. 1 is a front view of a cartridge case trimming machine in accordance with this invention.

The tubular casing trimming method of this invention generally comprises the steps of positioning the casing in axial alignment with a mandrel, an open end portion of the casing being directed toward the mandrel, positioning the mandrel within the open end portion, severing a ringlet from the open end portion of the casing, holding the ringlet on the mandrel, separating the mandrel from the trimmed casing and releasing the ringlet.

Referring now to FIGS. 1–4, a cartridge case trimming machine 11 is illustrated which may have a fixed frame 12 having a pair of upstanding sidewalls 14. A metallic base 15 is supported between the sidewalls 14 with a pair of oppositely positioned gibs 16 (FIG. 2) positioned in corresponding vertical grooves or ways 17 which are formed on the sidewalls 14. An operating shaft 19 is rotatably held by the sidewalls 14 in a substantially horizontal orientation and may have a large operating wheel 20 secured at one end portion to facilitate rotation of the shaft 19 by connection through a belt (not shown) to an operating motor in a well known manner. The shaft 19 is provided with an axially displaced eccentric portion 19a which is operatively connected through a link 21 to the base 15. During rotation of the shaft 19, the eccentric portion 19a reciprocates between positions vertically displaced alternately above and below the axis of the shaft 19 so that the link 21 is vertically reciprocated therewith. The base 15, being connected to the link 21, is reciprocated along with the link 21. This vertical motion is permitted by interaction of the gibs 16 in the vertical ways 17, which also maintains the proper orientation of the base. In this manner, vertical support is provided for the base 15 which is also thus vertically reciprocated one full cycle upon each rotation of the operating shaft 19.

A forward portion 15a of the base 15 has a vertical opening 22 (FIG. 3) provided therein. A pair of bearings 24 rotatably support a trim head assembly 25 within the opening 22.

Figure 2:
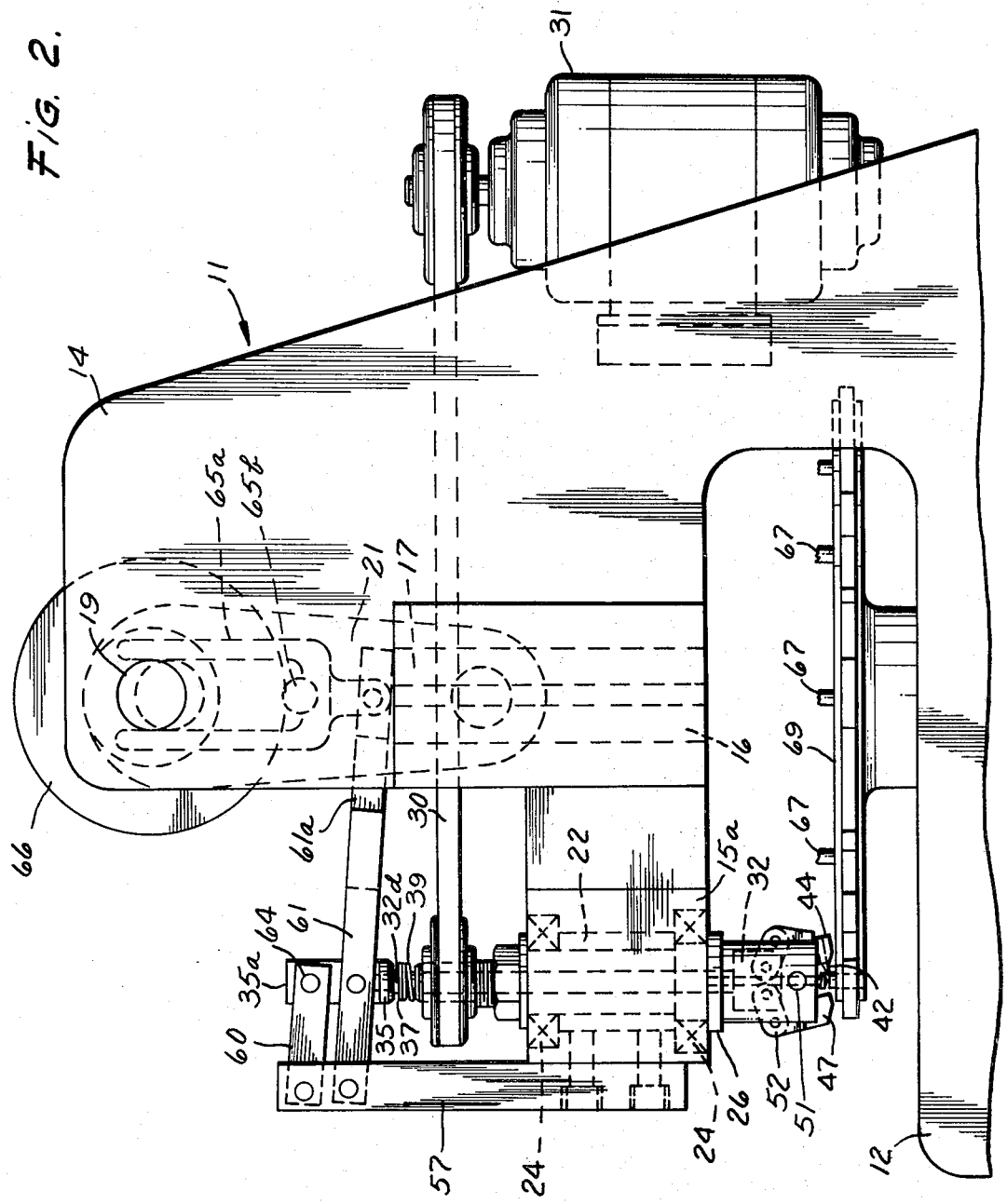
FIG. 2 is a side view of the trimming machine of FIG. 1 in a cutting configuration.
Figure 3:
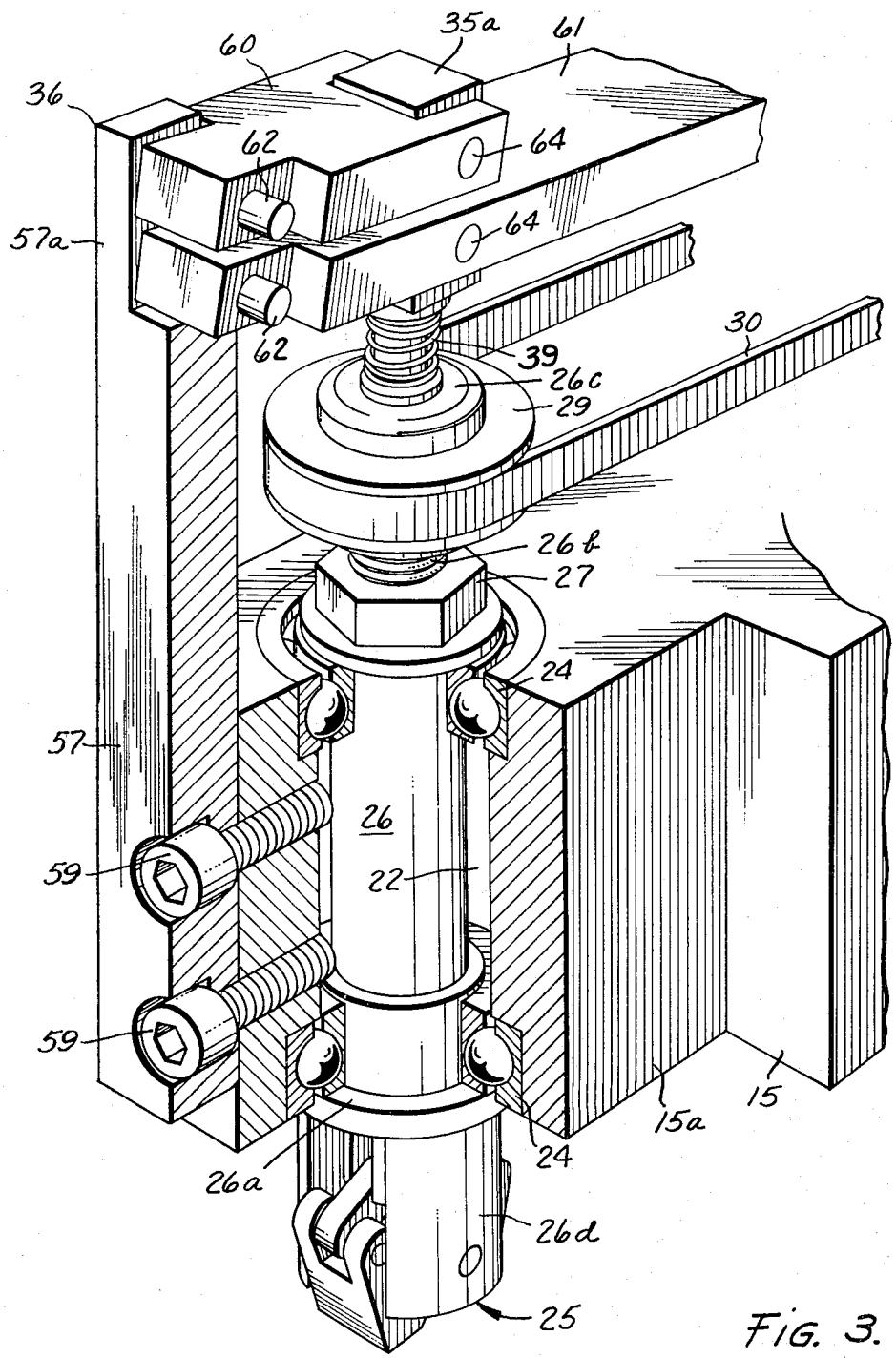
FIG. 3 is a fragmentary perspective view, partially cut away, of the trimming machine of FIG. 1.
Figure 4:
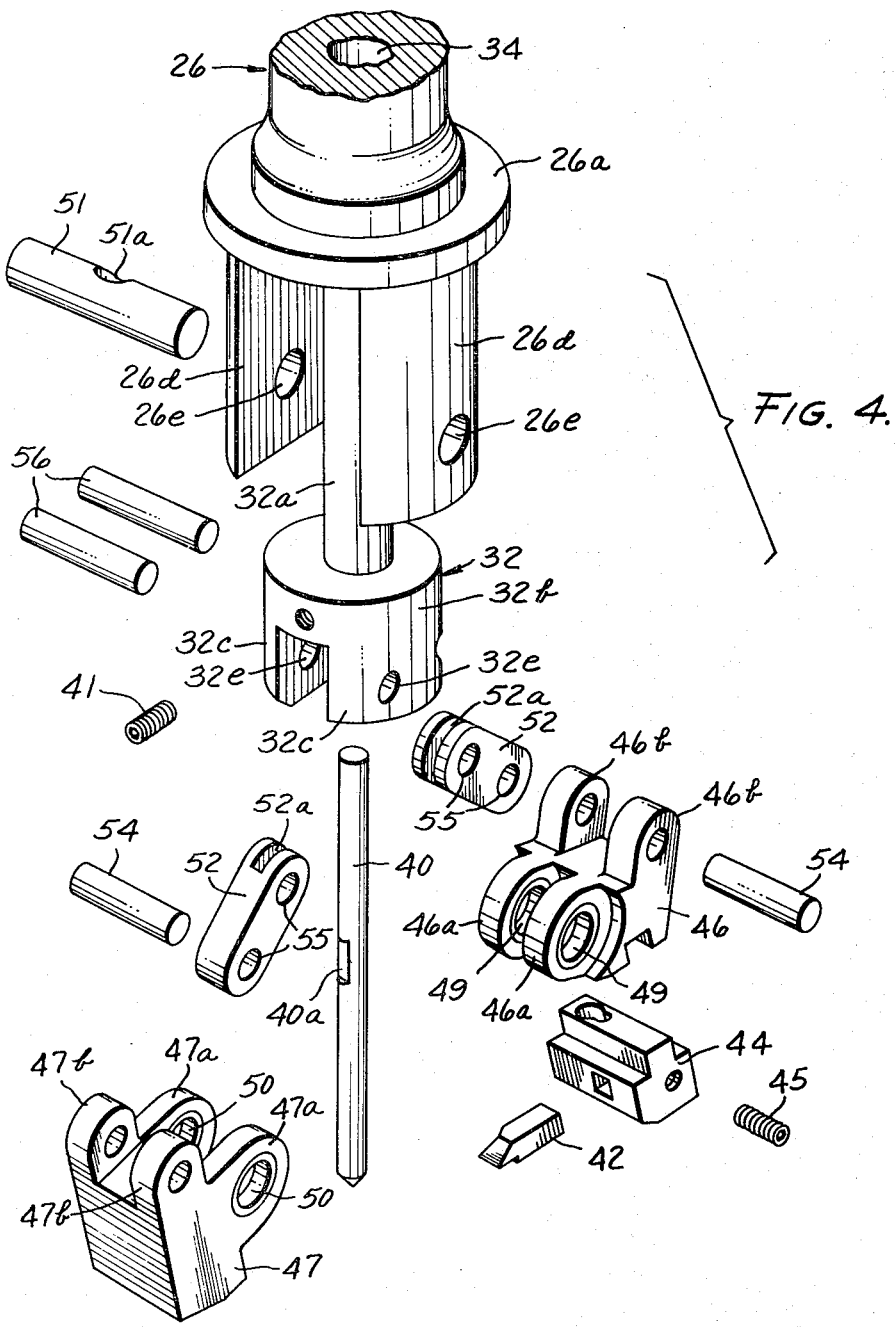
FIG. 4 is an exploded perspective view of a trim head assembly of the trimming machine of FIG. 1.

The trim head assembly 25, best shown in FIGS. 3 and 4, has an outer shaft 26 which engages the bearings 24 between an external flange 26a and a nut 27 which is tightly fitted onto a threaded portion 26b of the outer shaft 26. An upper end portion 26c of the outer shaft 26 has a pulley 29 affixed thereto to provide rotation of the outer shaft through connection by a belt 30 to a motor 31 (see FIG. 2) which may be attached to the frame 12. A lower end portion of the outer shaft 26 has a pair of downwardly extending legs 26d formed integrally therewith.

An inner shaft 32 has an elongated cylindrical portion 32a which extends through an axial opening 34 in the outer shaft 26. An enlarged lower portion 32b of the inner shaft 32 has a pair of downwardly extending legs 32c formed integrally therewith. An upper end portion 32d (FIG. 2) is journaled in a bearing 35 of a lever assembly 36. A washer 37 fitted in a slot (not shown) in the upper end portion 32d of the inner shaft 32 supports one end portion of a biasing spring 39 which also acts on the upper end portion 26c of the outer shaft 26 to urge the inner shaft 32 upwardly therefrom.

A mandrel 40 (FIG. 4) is held in an axial bore provided in the inner shaft 32 and extends downwardly therefrom. The mandrel 40 may be held in place by a set screw 41. To accommodate the set screw, a flattened portion 40a may be provided at a desired location on the mandrel.

A conventional cutting tool 42 is preferably mounted in a tool block 44 in any convenient manner, such as through the use of a set screw 45. The tool block 44 may be attached to a tool holder 46 by a threaded fastener (not shown). A counterbalancing member 47 is provided to prevent damage which might otherwise be caused by the eccentricity of the mass of the tool block 44 and tool holder 46. The counterbalancing member 47 preferably has the same weight and general configuration as the assembled tool holder 46 and tool block 44. Interlocking ears 46a and 47a on the tool holder 46 and counterbalancing member 47, respectively, are positioned so that their respective openings 49 and 50 can be aligned with each other to permit a pin 51 to be passed through the openings 49 and 50 and through openings 26e in the legs 26d of the outer shaft 26 to pivotably attach the tool holder 46 and counterbalancing member 47 to the outer shaft 26. A vertical bore 51a through the pin 51 is preferably provided to allow the mandrel 40 to pass through the pin 51 without interference.

The tool holder 46 and counterbalancing member 47 each have an additional pair of ears 46b and 47b, respectively, which are attached to links 52 by passing pins 54 through openings in each pair of ears and an aligned one of a pair of apertures 55, provided in each of the links 52. The links 52 are, in turn, connected to the inner shaft 32 by pins 56 passed through other of the pair of the link apertures 55 and through aligned openings 32e in the legs 32c. An inner end portion of each link 52 may be provided with a groove 52a to prevent interference with the mandrel 40.

The lever assembly 36 (FIGS. 1–3) controls the motion of the inner shaft 32 relative to the outer shaft 26 and has a vertical member 57 which is attached to the forward portion 15a of the base 15 by threaded fasteners 59 or other suitable attachment means. An upper end portion of the member 57 serves as a fulcrum 57a for the lever assembly 36 and may be bifurcated for better securement of the lever assembly.

A pair of levers 60 and 61 pivotably attached to the fulcrum 57a by suitable fasteners such as pins 62. The levers 60 and 61 are pivotably attached to an extended upper portion 35a of the bearing 35 by pins 64. Suitable openings are preferably provided in the levers 60 and 61 to accommodate the passage of the extended upper portion 35a of the bearing 35 therethrough.

A rear portion 61a of the lever 61 is pivotably attached to a suitable cam follower 65 which rides on a cam 66 which is mounted on the operating shaft 19 for rotation therewith. The rear portion 61a of the lever 61 may be laterally displaced to permit proper alignment of the cam follower 65 with the cam 66. The cam follower 65 preferably has a plurality of fingers 65a which interact with the operating shaft 19 to maintain the proper alignment of the cam follower 65 and a roller 65b which interacts with a camming surface 66a of the cam 66 to produce the desired motion of the lever 61. During rotation of the operating shaft 19, interaction of the cam follower 65 with the cam 66, through the lever 61, varies the position of the inner shaft 32 relative to the outer shaft 26 to control the position of the cutting tool 42 in a manner hereinafter described in detail. Thus, a proper contour of the camming surface 66a can produce any desired motion of the cutting tool 42 during each cycle of reciprocation of the base 15.

Casings 67 to be trimmed by the cartridge case trimming machine 11 may be carried to the trimming site by a rotating table 69 mounted to the frame 12 or by other suitable carriage means well known to those skilled in the art. Means for properly feeding the casings 67 into position on the rotating table 69 and for removing the trimmed casings 67a therefrom are also well known to those skilled in the art and are not shown.

Operation of the cartridge case trimming machine 11 will now be described with reference to FIGS. 1–6. The casing 67 to be trimmed is transported to the trimming site, i.e. to a position beneath and axially aligned with the mandrel 40, by rotation of the table 69. Before the casing 67 is moved into position, the trim head assembly 25 is in a position elevated from the table 69 by virtue of the axis of the eccentric portion 19a being above the principal axis of the operating shaft 19; the orientation of the cam 66 permits the inner shaft 32 to be urged by the biasing spring 39 to its uppermost position with respect to the outer shaft 26.

As the casing 67 is being positioned at the trimming site, the trim head assembly is moved toward its necessary position to perform the trimming operation. It will be readily understood that the operations of the cartridge case trimming machine 11 and the rotating table 69 may be coordinated through the use of a timing belt or other means (not shown). Rotation of the operating shaft 19 lowers the base 15 and thus the trim head assembly 25 toward the casing 67 to be trimmed. The action of the motor 31, through the belt 30, causes the pulley 29 and the outer shaft 26 to rotate at high speed. Because the outer shaft 26 is connected to the inner shaft 32 through the tool holder 46 and counterbalancing member 47 and the links 52, both the inner shaft 32 and outer shaft 26 as well as the entire trim head assembly 25 are rotated by the motor 31.

Figure 5:
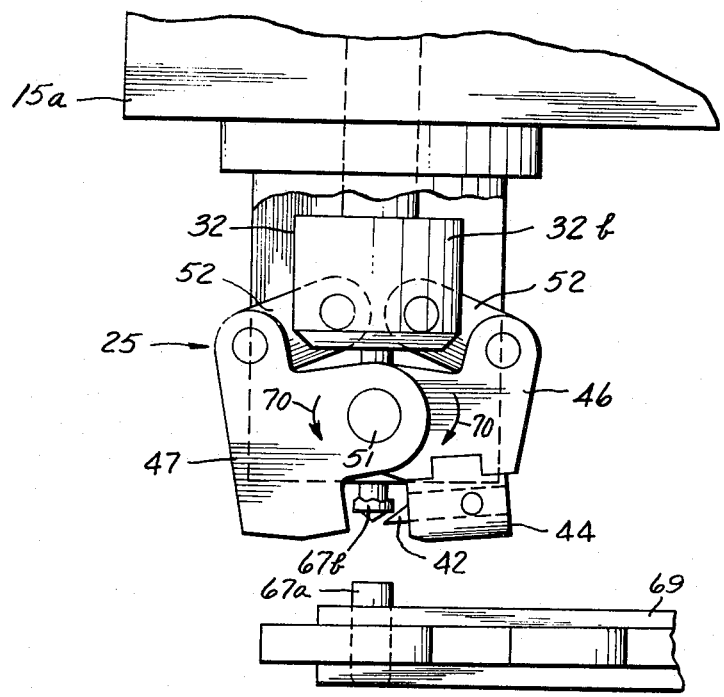
FIG. 5 is a side view of the trim head assembly in a raised position with a cutting tool thereof in a closed configuration.
Figure 6:
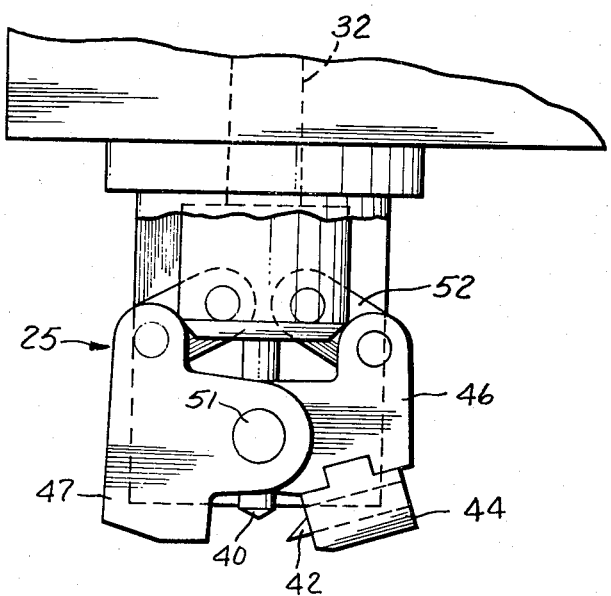
FIG. 6 is a side view similar to FIG. 5 with the cutting tool in an open configuration.

While the base 15 is being lowered by the motion of the eccentric portion 19a of the operating shaft 19, the cam 66 is preferably urging the cam follower 65 downward so that the lever 61, pivoting around the fulcrum 57a, causes the inner shaft 32 to travel downwardly at a rate greater than the outer shaft 26 compressing the biasing spring 39. The relative downward motion of the inner shaft 32 with respect to the outer shaft 26 is conveyed through the links 52 to the tool holder 46 and counterbalancing member 47 causing them to rotate around the pin 51 in the directions of the respective arrows 70 in FIG. 5. At the same time, the downward motion of the inner shaft 32 lowers the mandrel 40 so that its extended end portion positions itself within the open end of the casing 67. This helps ensure the proper alignment of the casing 67 during trimming. The pivotal motion of the tool holder 46 about the pin 51 causes the cutting tool 42, which, as previously indicated, is rapidly rotating around the casing 67, to be moved inwardly toward the casing so that, upon reaching the proper vertical position, it cuts through the casing 67 severing a ringlet 67b from its open end portion (see FIG. 2). It will be readily apparent that by properly coordinating the speed of revolution of the cutting tool 42 around the casing 67 and the rate of inward motion of the cutting tool, the cutting rate of the cartridge case trimming machine may be optimized, i.e. set at the maximum cutting rate appropriate for the material. As can be seen in FIGS. 2 and 5, the cutting tool 42 is located at a position just beneath the extended end portion of the mandrel 40 so that, until the tool holder 46 is rotated away from the mandrel 40, the ringlet 67b severed from the casing 67 is held on the mandrel 40 by the cutting tool 42.

Through interaction of the cam 66 and cam follower 65, the relative positions of the inner shaft 32 and outer shaft 26 causing the ringlet 67b to be retained on the mandrel 40 are retained while the trim head assembly 25 is raised vertically to the position shown in FIG. 5. Meanwhile, the table 69 may rotate moving the next casing 67 to the trimming site. Upon further rotation of the operating shaft 19, the cam 66 begins to release the cam follower 65, thus permitting upward motion of the lever 61. The upward force necessary to provide this motion is produced by the previously compressed biasing spring 39 which upwardly moves the inner shaft 32 with respect to the outer shaft 26 and causes the cam follower 65 to follow the contour of the camming surface 66a for controlling the relative positions of the inner and outer shafts.

As the inner shaft 32 is moved upwardly by the biasing spring 39, this motion translated through the links 52 so that the tool holder 46 and counterbalancing member 47 are rotated around the pin 51 in directions opposite those indicated by the respective arrows 70 of FIG. 5. By this motion, the trim head assembly 25 assumes the physical configuration shown in FIG. 6. With the cutting tool 42 withdrawn from its former position beneath the mandrel 40, the ringlet 67b which had been trimmed from the casing 67 is no longer held on the mandrel and falls therefrom for disposal. This may be accomplished by the use of several techniques as, for example, by directing a stream of a fluid, such as air, which will direct the ringlet toward and into a suction apparatus of a type well known to those skilled in the art. Alternatively, the structure could be modified to permit the trim head assembly 25 to be horizontally displaced from the vicinity of the trimming site prior to the release of the ringlet 67b so that the ringlet could be allowed to fall freely into a bin or other collection apparatus without interfering with moving parts.

In this manner, a trimming machine is disclosed which is adjustable for optimum cutting speed and can remove scrap ringlets from even steel cartridge cases and hold the ringlet for removal from the trimming site for orderly and controlled disposal.

I claim:

1. A trimming machine for a tubular casing having a longitudinal axis and an open end, said trimming machine comprising:
   a mandrel;
   cutting means;
   means mounting said mandrel for reciprocation along the longitudinal axis of the tubular casing for movement between axial positions extended into the open end of the casing and withdrawn therefrom;
   means mounting said cutting means for rotation about said longitudinal axis, for reciprocation along said longitudinal axis between axial positions extended for engaging said tubular casing and withdrawn therefrom, and for movement with a radial component of direction with respect to said longitudinal axis;
   and means drivingly connected with said mandrel and said cutting means and constructed and arranged for moving said mandrel and cutting means to their said extended axial positions while moving said cutting means radially into the casing to cut a scrap ringlet therefrom and hold the ringlet on said mandrel, and for subsequently moving said mandrel and cutting means to their said withdrawn axial positions and moving said cutting means radially away from said mandrel to release the scrap ringlet previously cut.

2. A trimming machine as recited in claim 1, said means drivingly connected with said mandrel and said cutting means comprising linkage means.

3. A trimming machine as recited in claim 2, said cutting means being mounted for pivotal movement with respect to said mandrel, said linkage means drivingly interconnecting said cutting means with said mandrel whereby relative axial motion therebetween displaces said cutting means with a radial component of direction relative to said longitudinal axis to produce said radial movements of said cutting mears.

4. A trimming machine as recited in claim 3, said drivingly-connected means being constructed and arranged for moving said mandrel and said cutting means through strokes of different lengths between the respective extended and withdrawn positions thereof, to produce said relative axial motion therebetween.

5. A trimming machine as recited in claim 1, said means mounting said cutting means comprising an outer shaft pivotally supporting said cutting means; said means mounting said mandrel comprising an inner shaft mounted within said outer shaft for movement along said longitudinal axis relative thereto; and said drivingly-connected means comprising linkage means pivotally connected to said inner shaft and to said cutting means; whereby relative movement of said inner and outer shafts along said longitudinal axis produces said radial movements of said cutting means.

6. A trimming machine as recited in claim 5, said drivingly-connected means further comprising camming means constructed and arranged for moving said outer and inner shafts reciprocably along said longitudinal axis to produce said movements of said mandrel and cutting means.

7. A trimming machine as recited in claim 6, said camming means further being constructed and arranged for moving said outer and inner shafts through strokes of different lengths between the respective extended and withdrawn positions thereof to produce said radial movements of said cutting means.

8. A trimming machine as recited in claim 1, together with conveyor means for positioning a series of tubular casings one at a time for trimming by said cutting means, with a longitudinal axis of each casing axially aligned with said mandrel.

* * * * *